July 23, 1929.  V. V. DE LOS SANTOS  1,721,947
DIRECTION SIGNAL FOR AUTOMOBILES
Filed May 23, 1928   5 Sheets-Sheet 1
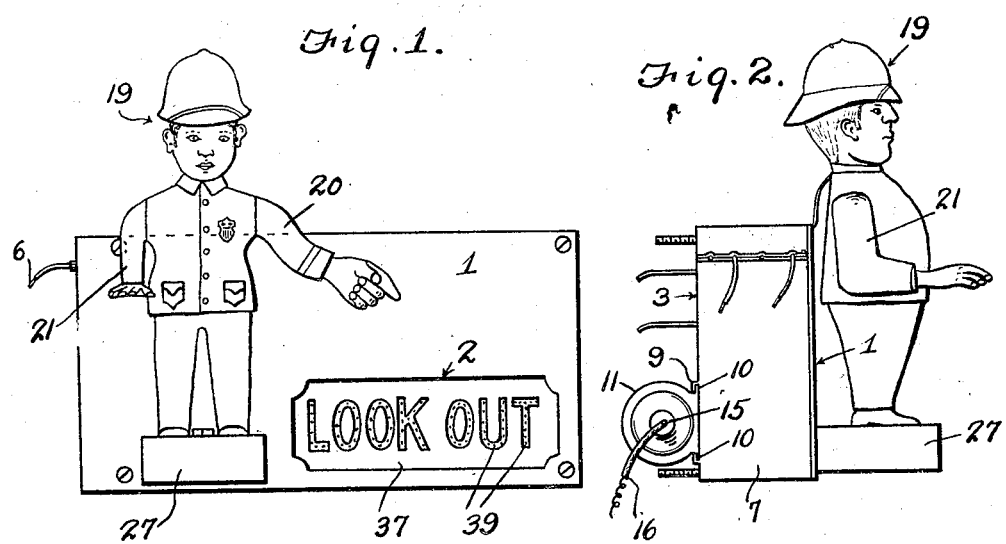
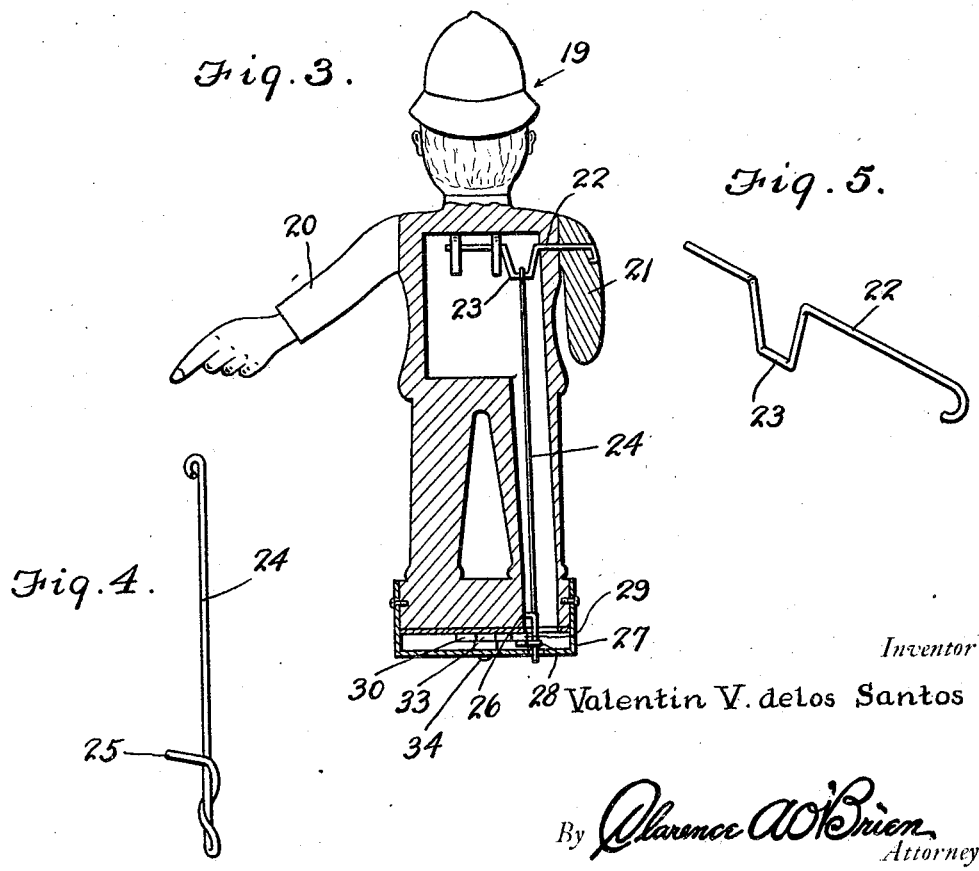
Inventor
Valentin V. delos Santos
By Clarence A. O'Brien
Attorney

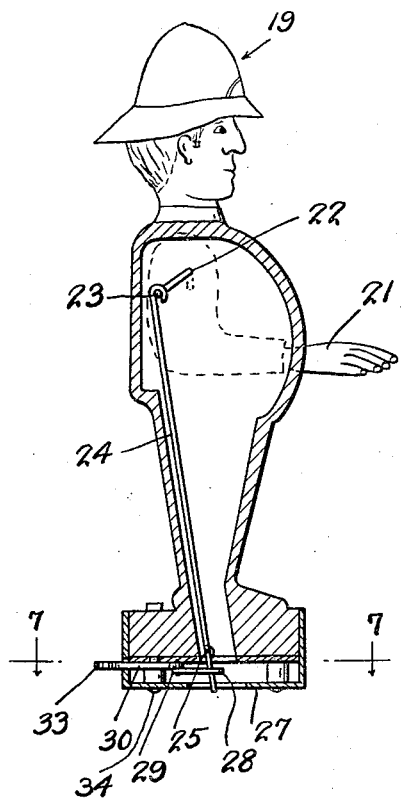
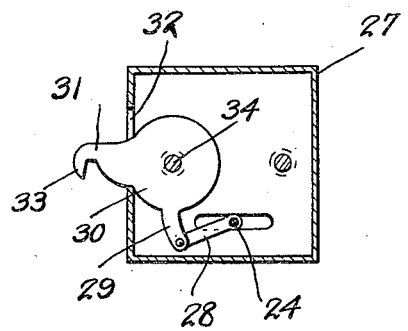
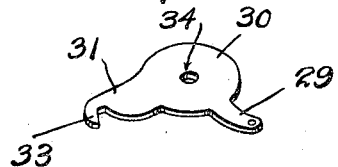
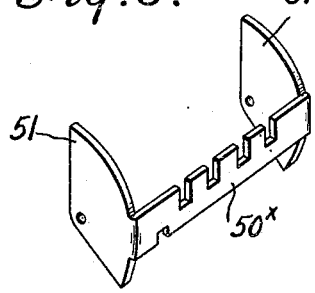
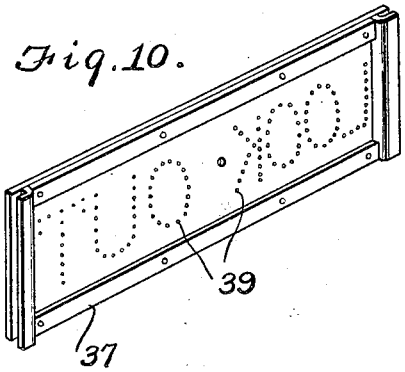
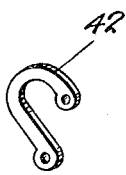

July 23, 1929.  V. V. DE LOS SANTOS  1,721,947
DIRECTION SIGNAL FOR AUTOMOBILES
Filed May 23, 1928   5 Sheets-Sheet 3
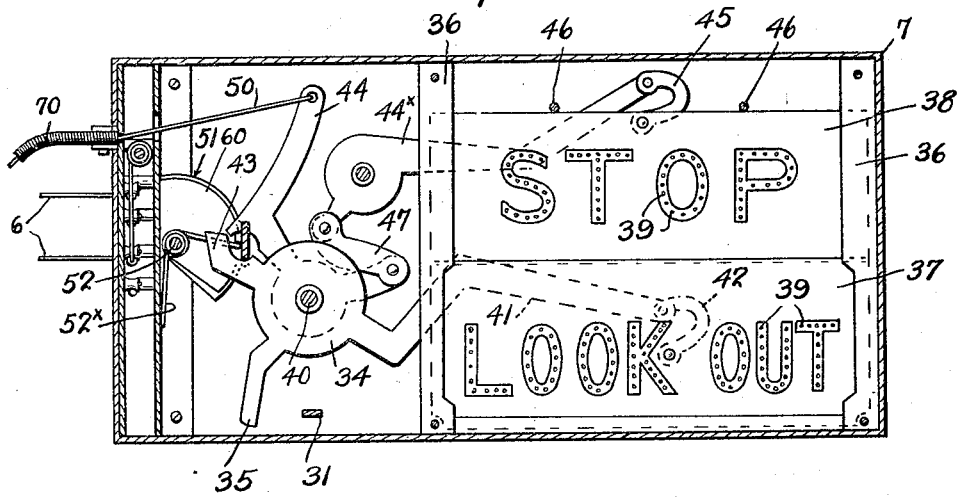
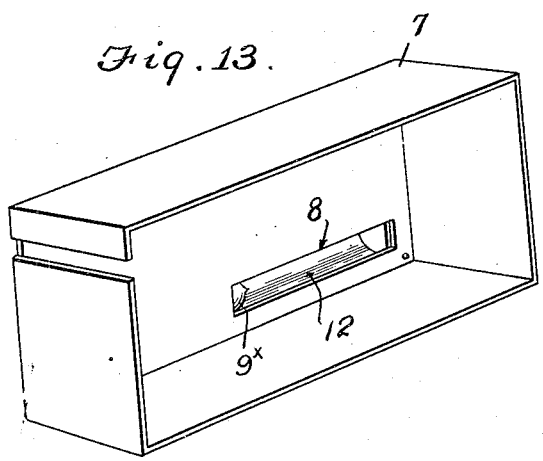
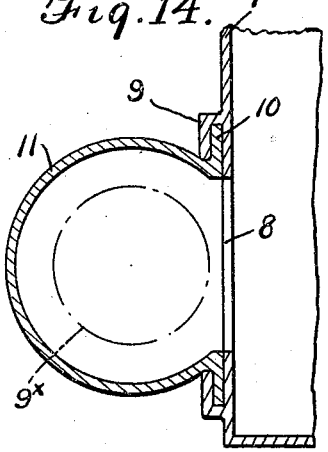
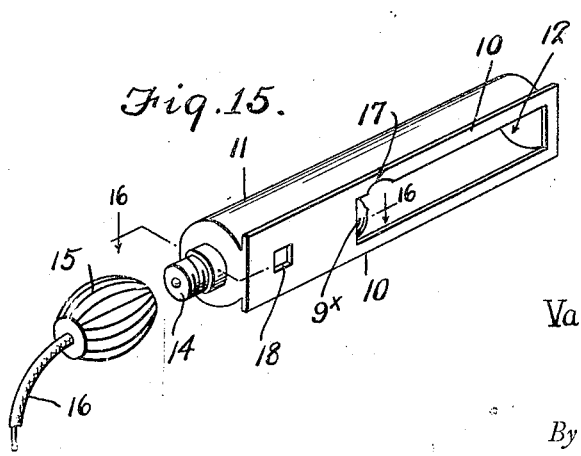
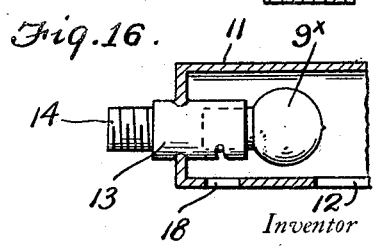
Inventor
Valentin V. de los Santos
By Clarence A. O'Brien
Attorney

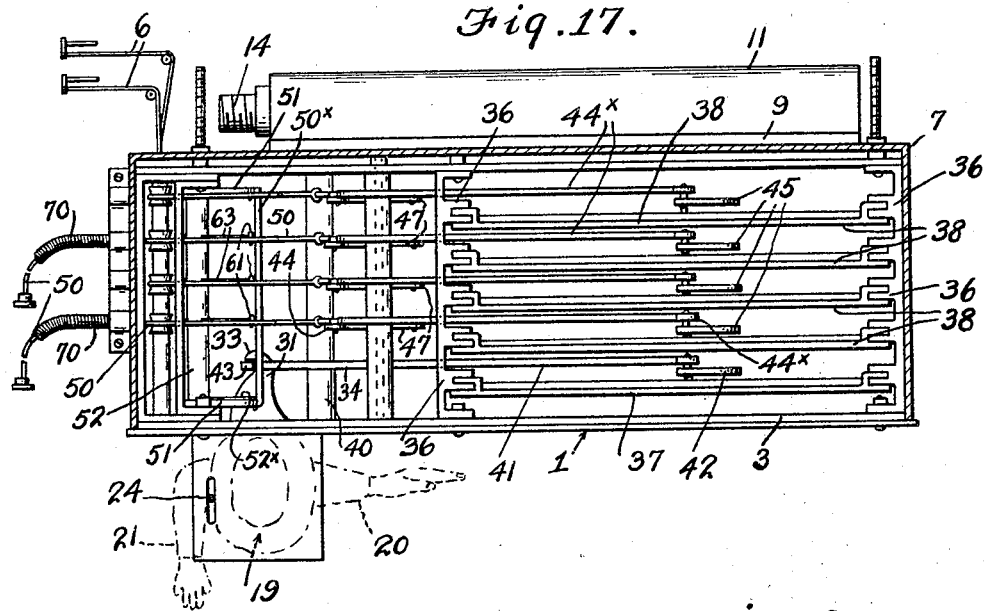
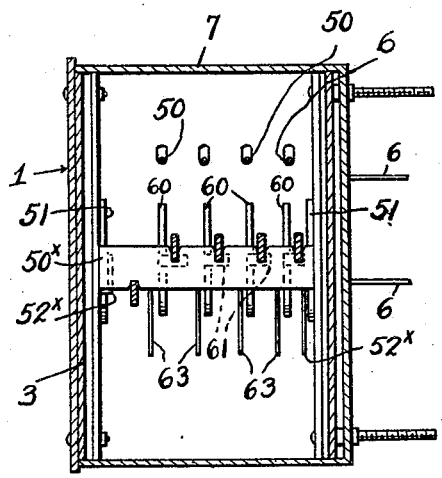 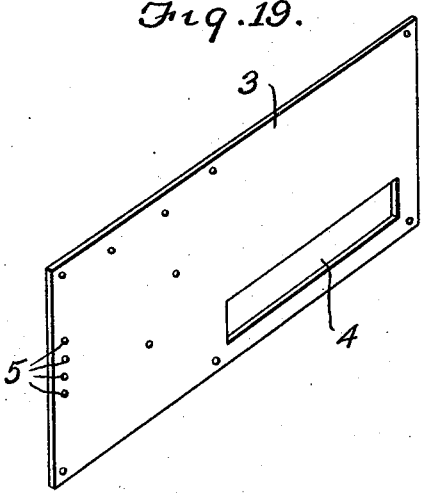
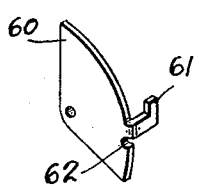

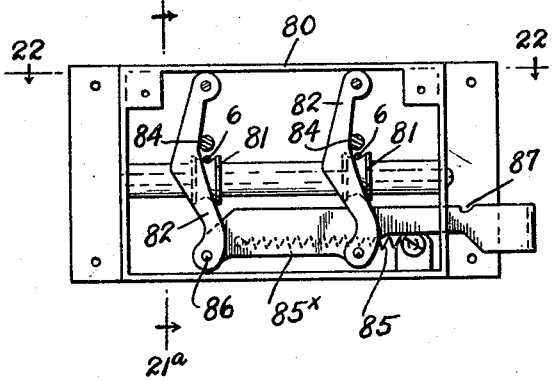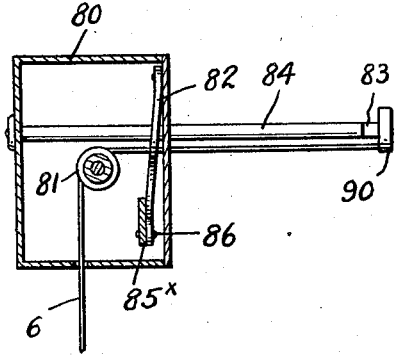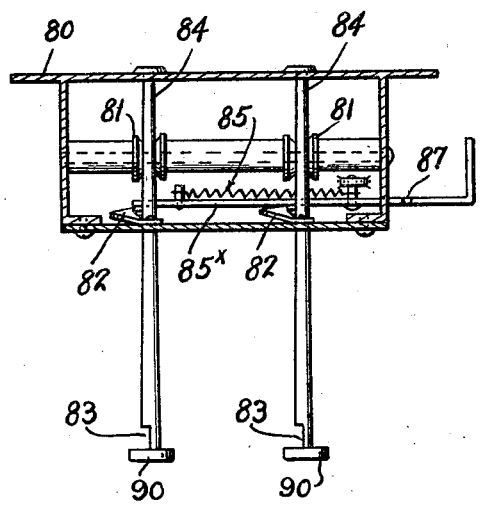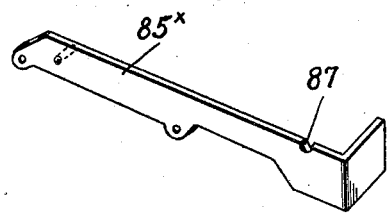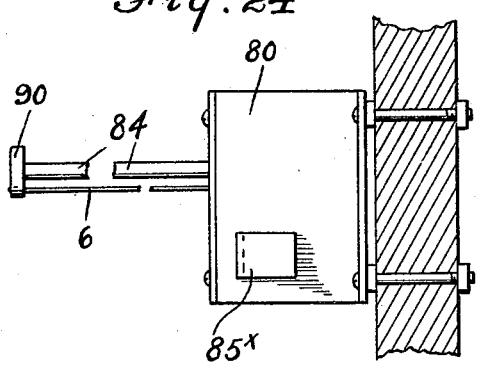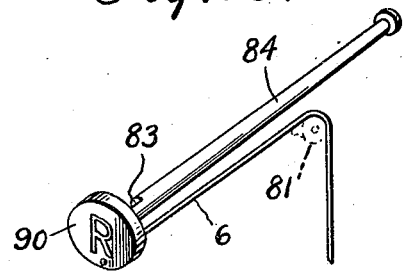

Patented July 23, 1929.

1,721,947

UNITED STATES PATENT OFFICE.

VALENTIN V. DE LOS SANTOS, OF MANILA, PHILIPPINE ISLANDS.

DIRECTION SIGNAL FOR AUTOMOBILES.

Application filed May 23, 1928. Serial No. 279,940.

The general object of my present invention is the provision of a direction signal for automobiles characterized by the capacity to attract the attention of motorists and pedestrians, and adapted to be manipulated by the operator of the car carrying the signal in such manner as to communicate to other motorists and pedestrians the intentions of the operator with respect to the handling of the automobile.

Other objects and practical advantages of the invention will be fully understood from the following description and claims when the same are read in connection with the drawings, accompanying and forming part of the specification, in which:—

Figure 1 is a face view of the direction signal constituting the preferred embodiment of my invention.

Figure 2 is an end elevation of the same.

Figure 3 is an enlarged sectional detail illustrative of mechanism in the hollow body of the figure, the figure being preferably made in simulation of a policeman.

Figures 4 and 5 are detail perspectives of elements comprised in the said mechanism.

Figure 6 is a vertical sectional view of the figure taken in a plane at right angles to Figure 3.

Figure 7 is a detail horizontal section taken in the plane indicated by the line 7—7 of Figure 6, looking downwardly.

Figure 8 is a detail perspective of the element in the lower portion of the figure.

Figures 9, 10 and 11 are perspectives of mechanism elements disclosed in the casing of the signal.

Figure 12 is a sectional view of the casing and showing movable parts therein.

Figure 13 is a perspective illustrative of the inner shell of the casing.

Figure 14 is an enlarged fragmentary section showing the preferred manner of connecting the lamp casing to the rear wall of the other or main casing.

Figure 15 comprises disconnected perspectives of said lamp casing and the means for connecting electric conductors to one end thereof.

Figure 16 is an enlarged detail section showing the manner in which the socket for the incandescent lamp is connected to one end of said lamp casing.

Figure 17 is a sectional top plan view of the signal as it appears with the top wall of the casing cut away, the figure of the policeman in said figure of the drawings being represented by dotted lines.

Figure 18 is a detail cross section showing the main casing and the working parts therein.

Figure 19 is a detail perspective of the back plate of the casing.

Figure 20 is a detail perspective of an important working part of the signal mechanism, hereinafter explicity referred to.

Figures 21 to 25, inclusive, are views illustrative of the mechanism through the medium of which an automobile operator is enabled to work my novel signal with facility.

Similar numerals of reference designate corresponding parts in Figures 1 to 20, which figures, for the sake of convenience in description, will first be referred to in detail.

The face wall of the main casing of my improvement is designated by 1, and is provided at 2 with a sight opening for the display of legends on slide of which five are preferably employed, Figure 17.

The back wall of the said casing is designated by 3, Figure 19, and is provided with an opening 4 and is also provided with a plurality of small openings 5, the latter being designed for the passage of cords or cables such as 6 in Figure 17.

Between the walls 1 and 3 and appropriately secured in position in said relation is a shell 7, Figure 13. The said shell is entirely open at its face side, and is provided in its opposite side or wall with an opening 8, in coincidence with the before mentioned opening 4 in the wall 3 so that the interior of the casing will be illuminated by an incandescent electric lamp $9^x$, Figures 15 and 16.

At this point I would have it distinctly understood that while for facility of manufacture I prefer to construct the main casing of my device in the manner described, I do not desire to be understood as restricting myself to said specific construction inasmuch as within the purview of my invention the said main casing may be of any construction compatible with my invention without departing therefrom.

On the outer side of the back wall of the shell 7 are longitudinal flanges 9, and in said flanges 9 are removably arranged the longitudinal flanges 10 on a lamp casing 11, Figures 14 and 15. The said lamp casing 11 is provided with an opening 12, for arrangement in the coincident position shown in Figure 14 to the opening 8 in shell 7. Manifestly the lamp casing 11 is adapted to be moved endwise into and out of engagement with the mentioned flanges 9, and it will also be noted that the lamp casing 11 is provided with a lamp socket 13 fixed to one of its end walls and adapted for the reception and detachable connection of the neck of the before mentioned incandescent electric lamp $9^x$. The lamp socket 13 is provided with the usual interior elements for the supply of current to the filament in the lamp bulb $9^x$, and it will also be noted from Figures 15 and 16 that the socket 13 is provided with a threaded end portion 14 for the engagement of a coupling 15 on electric conductors 16 which may lead from or be connected with any approved source of electric energy carried by the automobile. Obviously, when the lamp casing 11 is detached from the shell 7 a lamp may be expeditiously and easily removed from the socket 13 and as readily replaced by a fresh lamp, the opening 12 being provided with an offset 17 to permit of free passage of the lamp bulb. It will also be noted that the casing 11 is provided with an opening 18 through which an operative may readily discern when the neck of the lamp $9^x$ is properly engaged with the lamp socket 13.

Relatively arranged as shown in Figures 1 and 2 to the main casing of the signal is a figure 19 hollow in character and preferably made in simulation of a policeman as shown in Figures 1, 2, 3 and 6. The said figure 19 is provided with an arm 20 directed toward the before mentioned sight opening 2 and which arm 20 within the purview of my invention may be fixed or may be spring connected to the body of the figure. The said arm 20 is designed to guide the eye of the motorists and pedestrians through the said sight opening 2. Also carried on the body of the figure 19 is an arm 21 which when moved is intended to catch the eye and attract the attention of motorists and pedestrians so that they will quickly discern the particular direction signal displayed through the opening 2. The swingable arm 21 is appropriately fixed to a shaft 22 journaled in the upper portion of the figure body as best shown in Figures 3 and 6. The said shaft 22 is provided with a crank 23, and pivotally connected to the said crank 23 and depending therefrom in the hollow body of the figure is a lever member 24, Figures 3, 4 and 6. The said lever member 24 is provided at an intermediate point in its length with a lateral trunnion 25 which is journaled at 26 in the body of the figure 19, and in this connection it will be understood that the lever member 24 is adapted to be swung or oscillated in a plane at right angles to the face or front of the figure 19. Manifestly when the lever member 24 is so swung or oscillated, the arm 21 will be swung on the body of the figure 19 for the purpose before described.

The body of the figure 19 is fixedly connected at 26 to the main casing of the signal, and it will also be noted by comparison of Figures 1, 2, 3 and 6 that the body of the figure 19 is fixed to and surmounts a small casing 27. The portion of the lever member 24 below the trunnion or journal 25 extends downwardly through the casing 27 and is movable in a slot 28 in the casing 27, Figure 7 and is connected to a link 28 which link 28 is connected in turn to an arm 29 on a horizontally swingable member 30 which is provided with an additional arm 31, movable in a slot 32 in casing wall 27 and terminating in a toe 33. It will be readily apparent that when the swingable member 30 is rocked about its axis 34, the lever member 24 and the crank shaft 22 will be rocked and the arm 21 will be swung on the body of the figure 19.

The arm 31 of the element 30 is shown in Figure 12 as extending into the main casing of the signal, and consequently it will be understood that when the lever member 34, Figure 12, is swung in the direction indicated by arrow in Figure 12, an arm 35 of the said lever member 34 will, by striking against the arm 31 of the member 30 bring about actuation of the member 30 the lever member 24 and the arm 21 on the body of the figure 19.

By comparison of Figures 12 and 17, it will be appreciated that a plurality of fixed vertically disposed guides 36 are provided in the main casing. These fixed guides 36 are for the engagement of vertically movable slides 37 and 38. The slide 37 is shown in detail in Figure 10 and it is the slide nearest the sight opening 2. The major portion of the slide 37 is preferably of sheet metal, and it will be noted that the said major portion is provided with an appropriate legend such as "Look out" and is also provided in the letters of the legend with perforations 39, the latter being for the passage of light from the lamp $9^x$ so as to be readily discernable in the night time. The other slides 38 are provided with legends such as "Stop", "Right", "Slow", and "Left", respectively. It will also be noticed that in all of the letters of the legends on the slides 38 perforations 39 are provided for the purpose ascribed to the perforations 39 of the screen 37. From this it follows that in the night time when the filaments of the lamp $9^x$ is glowing and any one of the slides 38 is arranged with its legend in coincidence with the opening 2, the legend will be displayed in such a manner as to invariably attract the attention and catch the eye of motorists and pedestrians so that they will be duly warned of the intentions of the party operating the particular automobile carrying the signal.

The slide 37 is gravitational in the sense that it is adapted to normally rest in the position shown in Figure 12 and is also adapted when released to automatically assume said position by virtue of gravity. The other slides 38 are moved upwardly by spring means, hereinafter described, and are normally maintained in raised position by said spring means, and when a particular slide 38 is to be displayed through the sight opening 2, the said particular slide 38 is moved downwardly against the action of the spring means alluded to. From this it follows that when any one of the slides 38 is in its lowermost working position and it is released, the spring means referred to will operate to promptly raise the slide 38 to its upper idle position. I would also have it understood here that the scheme of my invention contemplates synchronously raising the "Look out" slide 37 with the lowering of one of the other slides 38. In other words, the slide 37 bearing the look out legend will rest in coincidence with the opening 2 until some emergency arises making necessary the display of one of the legends on one of the other slides 38 whereupon the slide 37 will be moved out of coincidence with the opening 2 and the other slide 38 will be moved into coincidence with said opening 2.

A shaft 40 is mounted in the main casing, Figure 12, and on the said shaft 40 is loosely mounted the before mentioned lever member 34. One arm 41 of the lever member 34 is connected by a curvilinear link 42 with the slide 37. It will also be noted that the lever member 34 is provided with an arm 43. Lever members 44 for the actuation or downward movement and upward movement of the slides 38 are also mounted on the before mentioned shaft 40. That is a lever member 44 complementary to each slide 38 and it is connected to the said slide by a link 45. It will also be gathered from Figure 12 that stop bolts 46 limit the upward movement of the slides 38. Each of the levers 44 is connected with its respective slide 38 through the medium of a lever member 44˟ to which the link 45 is directly connected, and a link 47 interposed between and connecting the lever member 44 and the said lever member 44˟. In this connection it will be understood that the lever members 44 and 44˟ will swing in concert for the raising and lowering of their respective slide 38. It being remembered that the present embodiment of my invention contemplates raising the slides 38 by spring means hereinafter described and also contemplates the lowering of the slides 38 against the action of the said spring means. To each of the lever members 44 is connected a cable 50 which is trained through appropriate apertures and over appropriate guides to points outside of the main casing; and it will also be understood that when the particular cable 50 of any one of the slides 38 is pulled upon, the slide 38 will be moved downwardly synchronously with the upward movement of the "Look out" slide 37.

By reference to Figure 18 it will be noted that there are four of the levers 44 and four of the cables 50, and it will also be noticed that all of the levers 44 rest above the cross bar 50˟ of a swingable yoke, shown in detail in Figure 9, while the before mentioned arm 43 of the lever member 34 complementary to the slide 37 rests under the said cross bar 50˟ of the yoke. It being remembered that the slide 37 normally rests in the position shown in Figure 12, it will be understood that when any one of the levers 44 is swung downwardly for the depression of its respective slide 38, the said lever 44 will act against and move downwardly the cross bar 50˟ of the yoke, the said cross bar 50 by acting against the arm 43 of the lever member 34 will rock said lever member 34 and thereby raise the slide 37 from its normal position in coincidence with the sight opening 2.

In addition to the cross bar 50˟ the yoke comprises end portions 51 of general sector shape. The said members 51 are pivotally mounted on a shaft 52, Figure 12, and for the purpose of raising the bar 50˟ of the yoke after a depression of said bar and for yieldingly maintaining the bar 50˟ in the position shown in Figure 12 I provide a spring 52˟, Figure 12, said spring 52˟ being coiled about the shaft 52 and having one arm bearing outwardly against the adjacent wall of the main casing and its other arm appropriately connected to or engaged with the bar 50˟. Manifestly when said bar 50˟ is forced downwardly against the action of the spring 52˟, the spring 52˟ will serve when said bar 50˟ is released, to raise the bar 50˟ to the position shown in Figure 12.

As best shown in Figure 18 there are four sector-shaped members 60 loosely mounted on the shaft 52. One of the said members 60 is shown in perspective in Figure 20, and from Figures 12, 18 and 20 it will be understood that each of the members 60 is provided with a lateral hook 61 to rest under one lever member 44, and is also provided below the lateral hook with a notch 62. The said notch 62 is for the reception of one arm of a spring 63 which is coiled about the shaft 52 and has another arm which bears against the adjacent wall of the main casing. It being understood that there is a spring 63 complementary to each sector shaped member 60, it will be understood that on downward swinging movement of the hook bearing portion of any one of the members 60, the spring of said member 60 will be tensioned, and therefore when the member 60 is released the spring will operate to return the member to its normal position. It will also be understood that in the normal position of the yoke the portions 51 thereof will bear solidly against the adjacent wall of the casing, and that in the normal positions of the members 60 said members 60 will also bear solidly against the adjacent wall of the main casing. This is clearly shown at the left of Figure 12.

When deemed expedient all of the cables or pull cords complementary to the several lever members 44 may be sheathed in flexible conduits. One of the conduits of the kind alluded to is shown in Figure 12 and is numbered 70.

It will be gathered from the foregoing that when the proper pull cord or cable 50 is drawn upon to lower one of the slides 38 and simultaneously raise the slide 37, the pulling of the cord 50 toward the left in Figure 12 will be attended by downward movement of the major portion of the respective lever member 44. When this is done the cross bar of the yoke will be depressed and by the action of the same against the arm 43 of the lever member 34, the said lever member 34 will be swung upwardly and will raise the "Look out" slide 37. At the same time the lever member 44 alluded to will swing its respective member 60 downwardly and will through the lever member 44$^x$ and the connections described move the respective slide 38 downwardly and so as to put its legend into coincidence with the sight opening 2. When this is done the spring complementary to the said member 60 will be tensioned so that when the pull on the particular cord or cable is released, the spring complementary to said member 60 will swing the same upwardly with the result that through the connections described the member or slide 38 alluded to will be raised.

It will be apparent from the foregoing that normally the slide with the legend "Look out" is exposed by novel signal device and that at the will of the automobile operator the said slide 37 may be quickly and easily displaced and its place taken by any one of the slides 38 selected to meet any particular emergency that is encountered. For instance if the motorist is about to bring his automobile to a stop, the cable complementary to the stop slide 38 is pulled, whereupon the said slide 38 will be quickly moved downwardly and the "Look out" slide 37 will be synchronously moved upward so that the legend "Stop" will be displayed through the sight opening 2. It will also be noted that all of the slides 38 may be moved in the manner described with equal facility and speed, and consequently other motorists as well as pedestrian may be apprised of the fact when the operator of the automobile equipped with the signal contemplates reducing his speed and also when he contemplates turning either to the right or to the left.

It will also be appreciated from the foregoing that when properly embellished my novel signal is calculated to enhance rather than detract from the finished appearance of an automobile.

Any appropriate means may be employed for the operation of the cables of my improvement without affecting or departing from my invention. I prefer, however, to employ for the manipulation of the said cables which may be of wire or other appropriate material the means illustrated in Figures 21 to 25 of the drawings. Among other elements the said means comprises a casing 80 which may be arranged on an instrument or on any other appropriate support in an automobile. In the said casing 80 are guide sheaves 81 over which are carried cables such as 6. These cables are the ones in connection with the mechanisms for operating the right and left slides 38; and in this connection it will be understood that the stop and slow slides 38 may be operated through the medium of cables such as shown at left hand end of Figure 17.

Also arranged in the casing 80 and adjacent to one wall thereof are locking members 82 of swinging type which are adapted to enter notches 83 in rods 84, when the said rods 84 are positioned so that the notches 83 will be partly within the casing 80. A retractile spring 85 serves to hold the locking members 82 yieldingly in the said notches 83 of the rods 84 and in this connection it will be understood that the said retractile spring 85 is connected at one end to the casing 80 and at its opposite end to a bar 85$^x$ pivotally connected at 86 to one of the locking members 82 and extending through an opening in one end wall of the casing 80 and having a notch 87 adapted to engage said end wall. It will also be noted that the bar 85$^x$ is connected in pivotal manner to the other locking member 82. When the locking members 82 are in the position shown in Figure 21 the locking members 82 will rest in the notches 83 of the rods 84, the locking members 82 being yieldingly maintained in the said notches by the retractile spring described. When, however, the bar 85$^x$ is pressed inwardly against the action of the retractile spring and the notch 87 of the bar is engaged with the end wall of the casing, the locking members 82 will manifestly be held out of engagement with the notches in the bars or rods 84 and consequently the said rods may be pulled for the movement of the cables 6 and the actuation of the working parts in connection with said cables.

As illustrated the cables 6 are connected at one end to head 90 on the rods 84 and the said heads 90 will by preference be provided with letters "R" and "L" indicative that one is complementary to the right turn signal slide 38 and the other is complementary to the left hand turn signal slide.

In addition to the practical advantages ascribed to my improvement, it will be noted that the improvement is simple and inexpensive in construction, is compact, reliable in operation and adapted to well withstand the vibration to which automobile appurtenances are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as limiting myself to the specific construction and relative arrangement of parts as disclosed herein, my invention being defined by appended claims within the scope of which modifications may be made without departing from my invention.

Having described my invention, what I claim as new is:—

1. In a direction signal and in combination, a casing having a sight opening and also having a plurality of pairs of vertically disposed guides, a gravitational slide movable in one pair of said guides and normally resting in coincidence with said sight opening, a plurality of selective slides movable vertically in other pairs of the guides, a lever mounted in the casing and connected with the first named slide and having auxiliary arms, lever members also mounted in the casing and connected with the selective slides, one lever mounted to each selective slide member, a vertically swingable yoke having a notched cross bar to receive the second named lever member and to also receive and engage one of the auxiliary arms of the first named lever, vertically swingable members having hooks disposed under the second named lever members, springs complementary to the yoke and to said hooks bearing swingable members for yieldingly maintaining the same against the wall of the casing, means connected with the second named lever members for the movement thereof to lower the selective slides against the action of said spring means, a figure of hollow form connected with the casing and having a movable member, a crank shaft mounted in said figure and connected with the movable member thereof, a lever fulcrumed at an intermediate point in its length in the hollow figure and connected with the crank of said shaft, and a swingable member connected with the lower arm of said lever and having an arm arranged in the path of and adapted to be moved by the other auxiliary arm of the first named lever.

2. The combination in a direction signal, of a casing having a sight opening and also having a plurality of pairs of vertically disposed guides, a gravitational slide arranged in one pair of guides and normally resting in coincidence with said sight opening, a lever member mounted in the casing and having a long arm and also having auxiliary arms, a link connecting the long arm of said lever member and the gravitational slides, selective slides arranged in other pairs of guides in the casing and normally maintained in yielding manner in raised position out of coincidence with said sight opening, lever members mounted in the casing, links connecting said lever members to the selective slides, other lever members mounted in the casing, links connecting the third named lever members and the second named lever members, a vertically swingable yoke depressible by any one of the third named lever members and adapted to engage one of the auxiliary arms of the first named lever member and rock said lever member for the raising of the gravitational slide, means for moving the third named levers, spring means complementary to the yoke for raising the same, spring means complementary to the third named levers for the raising of said levers, a hollow figure arranged exteriorly of and connected with the casing and having a movable member, a lever in said hollow figure and connected with said movable member for the movement thereof, and a swingable member connected with the lower arm of said lever and having an arm arranged in the path of and adapted to be moved by the other auxiliary arm of the first named lever.

3. Means for actuating the movable part of a direction signal comprising cables, a casing receiving said cables and having guide means therefor, rods movable in said casing and having heads connected with the cables and also having notches adjacent to said heads and adapted to rest in the casing, locking levers mounted in the casing and adapted to enter the notches of the rods, said rods when released from said levers being endwise movable, a bar connected with the locking levers and extending through an aperture in one wall of the casing and having a notch to engage said wall and hold the locking levers out of engagement with the rods, and spring means connected with said bar for yieldingly maintaining the locking levers in the said notches of the endwise movable rods.

In testimony whereof I affix my signature.

VALENTIN V. DE LOS SANTOS.